(12) United States Patent
Chen et al.

(10) Patent No.: US 10,949,242 B2
(45) Date of Patent: Mar. 16, 2021

(54) DEVELOPMENT OF EMBEDDED TYPE DEVICES AND RUNNING METHOD FOR EMBEDDED TYPE VIRTUAL DEVICE AND SYSTEM

(71) Applicants: NR ELECTRIC CO., LTD, Jiangsu (CN); NR ENGINEERING CO., LTD, Jiangsu (CN)

(72) Inventors: Hongjun Chen, Jiangsu (CN); Qiang Zhou, Jiangsu (CN); Jifeng Wen, Jiangsu (CN); Jiuhu Li, Jiangsu (CN); Dongfang Xu, Jiangsu (CN); Guanghua Li, Jiangsu (CN); Wei Liu, Jiangsu (CN); Dewen Li, Jiangsu (CN); Lei Zhou, Jiangsu (CN); Tianen Zhao, Jiangsu (CN)

(73) Assignees: NR ELECTRIC CO., LTD, Jiangsu (CN); NR ENGINEERING CO., LTD, Jiangsu (CN)

(*) Notice: Subject to any disclaimer, the term of this patent is extended or adjusted under 35 U.S.C. 154(b) by 0 days.

(21) Appl. No.: 16/343,389

(22) PCT Filed: May 26, 2017

(86) PCT No.: PCT/CN2017/086081
§ 371 (c)(1),
(2) Date: Apr. 18, 2019

(87) PCT Pub. No.: WO2018/072445
PCT Pub. Date: Apr. 26, 2018

(65) Prior Publication Data
US 2019/0317791 A1 Oct. 17, 2019

(30) Foreign Application Priority Data
Oct. 20, 2016 (CN) .......................... 201610913664.6

(51) Int. Cl.
*G06F 9/455* (2018.01)
*G06F 9/451* (2018.01)

(52) U.S. Cl.
CPC .......... *G06F 9/45558* (2013.01); *G06F 9/451* (2018.02); *G06F 2009/4557* (2013.01)

(58) Field of Classification Search
None
See application file for complete search history.

(56) References Cited

U.S. PATENT DOCUMENTS 5,444,853 A * 8/1995 Lentz ........................ G06F 5/06
710/22
5,892,941 A * 4/1999 Khan ................... G06F 11/3664
703/22

(Continued)

FOREIGN PATENT DOCUMENTS

CN 101453371 A 6/2009
CN 102508697 A 6/2012

(Continued)

OTHER PUBLICATIONS

Google Patents search, "Platform and method for testing process layer to spacer layer of digital substation" CN104267283A (translation) in corresponding Chinese Patent CN-104267283-A (Publication: Jan. 7, 2015) [Retrieved on Oct. 1, 2019] (Year: 2015).*

(Continued)

*Primary Examiner* — Meng Ai T An
*Assistant Examiner* — Zujia Xu
(74) *Attorney, Agent, or Firm* — Masuvalley & Partners (57) ABSTRACT

Disclosed by the present invention are a running method for an embedded type virtual device and a system, an embedded type device being divided into a managing process, a plurality of real-time modules and a plurality of non-real-time modules. The managing process reading a configuration file, (Continued)

Running architecture diagram of embedded type virtual device loading real-time and non-real-time module libraries of each processor and completing initialization interaction by means of a virtual controller area network (CAN) bus and first in, first out (FIFO) communication. The managing process starting a real-time thread and serially scheduling real-time task according to a task period setting relation. The managing process starting a plurality of non-real-time threads, calling a period task of a non-real-time module and carrying out parallel communication with a plurality of debugging clients. The real-time modules exchange data with each other by means of a virtual data bus, and the real-time modules exchange data with the non-real-time modules by means of a sharing memory.

11 Claims, 4 Drawing Sheets

(56) References Cited

U.S. PATENT DOCUMENTS

| | | | |
|---|---|---|---|
| 10,387,182 B2* | 8/2019 | Jiang | G06F 9/54 |
| 2001/0049594 A1* | 12/2001 | Klevans | H04L 41/12 |
| | | | 703/14 |
| 2006/0253762 A1* | 11/2006 | Schalick | G01R 31/31704 |
| | | | 714/742 |
| 2010/0324962 A1* | 12/2010 | Nesler | G01R 21/133 |
| | | | 705/7.36 |
| 2012/0082156 A1* | 4/2012 | Swartzentruber | H04L 41/147 |
| | | | 370/389 |
| 2012/0167044 A1* | 6/2012 | Fortier | G06F 9/455 |
| | | | 717/121 |
| 2014/0130048 A1 | 5/2014 | Soundararajan et al. | |
| 2014/0139533 A1* | 5/2014 | Jan | G06F 15/76 |
| | | | 345/520 |
| 2015/0067688 A1* | 3/2015 | Nagasawa | G06F 9/4881 |
| | | | 718/102 |
| 2015/0339214 A1* | 11/2015 | Rozenman | G06F 11/3664 |
| | | | 717/130 |
| 2018/0032064 A1* | 2/2018 | Fang | A61B 6/02 |

FOREIGN PATENT DOCUMENTS

| | | |
|---|---|---|
| CN | 102609297 A | 7/2012 |
| CN | 104267283 A * | 1/2015 |
| CN | 106445640 A | 2/2017 |

OTHER PUBLICATIONS

ISA/CN, International Search Report dated Aug. 8, 2017, International Application No. PCT/CN2017/086081, 4 pages including English translation.

* cited by examiner

Running architecture diagram of embedded type virtual device

FIG. 1

Initialization process of embedded type virtual device

System structure diagram of embedded type virtual device

FIG. 4

DEVELOPMENT OF EMBEDDED TYPE DEVICES AND RUNNING METHOD FOR EMBEDDED TYPE VIRTUAL DEVICE AND SYSTEM

RELATED APPLICATIONS

This application is the U.S. National Phase of and claims priority to International Patent Application No. PCT/CN2017/086081, International Filing Date May 26, 2017; which claims benefit of Chinese Patent Application No. 201610913664.6 filed Oct. 20, 2016; both of which are incorporated herein by reference in their entireties.

FIELD OF THE INVENTION

The present invention belongs to the field of development of embedded type devices, and particularly relates to a running method for an embedded type virtual device and a system.

DESCRIPTION OF RELATED ART

An embedded type device is key equipment for safe and stable operation in fields of power systems, industrial control and the like, and has high professionalization threshold, complicated research and development processes, complicated functions needing to be developed by teams, and high research and development cost. The research and development of the embedded type device includes application algorithms, software and hardware platforms, device debugging, and the like. The current integration degree of the embedded type device is also increasing. For example, a centralized protection measurement and control device includes a plurality of professional functions such as line protection, transformer protection, busbar protection, stability control and measurement and control, the serial research and development of the device needs a long period, and the parallel research and development of the device needs more device samples and debugging devices. In order to improve the research and development efficiency of the device and lower the research and development cost, it is necessary to provide a running method for an embedded type virtual device and a system, the actual hardware environment of the device can be simulated, and the functions of the device are tested based on virtual input data. The virtual methods in the existing literature often focus on simulation tests of application algorithms, and equivalent simulation methods of whole devices are not involved. In actual device development, in addition to supporting application functions, functions of man-machine interfaces, communication and the like also need to be debugged, which is also an important part in product research and development, so that it is necessary to provide an equivalent running method for complete simulation of an embedded type device and a system so as to realize complete device function verification tests. The present disclosure is created therefore.

SUMMARY OF THE INVENTION

The objective of the present invention is to realize the virtual running environment of an embedded type device and obtain complete virtual running test functions. In order to achieve the above objective, the present invention is directed to a running method for an embedded type virtual device, where a virtual managing process reads a configuration file of the device, loads real-time modules and non-real-time modules, serially schedules the tasks of each real-time module in grades according to a task period setting relation in a real-time scheduling thread, and realizes accurate synchronization of data exchange among a plurality of processors. The virtual managing process starts a plurality of threads to run event callback and period tasks of the non-real-time modules, and carries out parallel communication with a plurality of protocol debugging clients. The running method specifically includes the following steps:

step 1: a simulation main interface process of a personal computer (PC) acquires simulation setting information and starts the virtual managing process of the embedded type device; the virtual managing process reads the configuration file of the device, acquires the configuration information of hardware, loads the real-time module of each processor, acquires the process configuration information of a main central processing unit (CPU), and loads the corresponding non-real-time module; the managing process reads the man-machine communication configuration information in the configuration file, and creates a configuration sharing memory; when loading modules, the managing process extracts and records a predefined module export function address;

step 2: the virtual managing process carries out initialization interaction by means of a virtual CAN bus and the real-time modules according to a hardware statement order, and the managing process gathers the data exchange information of each real-time module and creates a data bus; the virtual managing process carries out initialization interaction by means of virtual FIFO and the non-real-time modules according to a non-real-time process statement order in the configuration file;

step 3: the virtual managing process starts a virtual real-time task scheduling thread, calls an export interface predefined by the real-time modules, and serially schedules the real-time tasks in each period in grades; the virtual managing process starts a plurality of non-real-time threads, calls period tasks of non-real-time modules, and carries out parallel communication with a plurality of debugging clients; and step 4: in the running process of the virtual device, the real-time modules acquire interactive data between processors based on the data bus, and the real-time modules exchange data with the non-real-time modules based on the sharing memory; the real-time SLAVE module refreshes the variable agents of the non-real-time modules to the data bus so as to be transferred to other processors.

Further, in step 1, the real-time module of a digital signal processor (DSP) is a dynamic link library and is compiled by an operating system-less application program of the embedded type device and a virtual system library of the DSP. The real-time module SLAVE of a main CPU is a dynamic link library and is compiled by a real-time program developed by the embedded type device based on an operating system after transplantation and reconstruction and a virtual real-time system library of the main CPU. The non-real-time module is compiled by a non-real-time program developed by the embedded type device based on the operating system after transplantation and reconstruction and a virtual non-real-time system library of the main CPU. Based on a virtual platform library of the PC, only the compiling environment of the application program of the device needs to be switched to realize recompilation, and codes do not need to be modified. A virtual simulation device and an actual device share the same configuration file, and the application personnel do not need to modify the device configuration.

Further, in step 3, the tasks of each real-time module are serially managed according to the period grade, the virtual real-time task scheduling thread calculates the least common multiple of a plurality of real-time task periods of the device, the least common multiple is taken as a step size cycle, and when the step sizes are accumulated to the period value of the corresponding grade, the task of this grade is called and the time mark of the virtual device is updated to the sharing memory, where the minimum resolution is virtual microsecond.

Further, the virtual real-time task scheduling thread supports scheduling according to an order of data bus reading, real-time task operation and data bus writing so as to accurately simulate one point delay of a parallel bus of the embedded type device, and also supports scheduling according to an order of data bus reading, data bus writing and real-time task operation so as to accurately simulate two point delays of a serial bus of the embedded type device, where scheduling modes can be configured.

Further, in step 3, a period calling interface of a non-real-time thread supports communication message receiving and transmitting tasks based on event trigger, and supports reading of the actual time of the PC to execute a millisecond-grade period task.

Further, in step 4, the real-time module SLAVE creates a circular buffer area, can store the second-grade data accumulated by the data bus, and is used for recording a plurality of period data before recording trigger during recording of the virtual device. The non-real-time module reads the data of the corresponding point from the buffer area according to the current virtual time mark in the sharing memory so as to be transferred to a debugging client to be displayed.

Further, in step 3, the debugging client supports visual page debugging, IEC61850 protocol debugging, IEC103 debugging, liquid crystal display (LCD) debugging, and the like. Based on a system public library, new debugging protocols can be flexibly expanded, and new modules can be developed.

Further, in step 1, after the simulation main interface process of the PC starts the virtual managing process, the prompt information in initialization and running processes of the virtual device is displayed in real time by means of output redirection. The simulation main interface process of the PC supports simulation modes such as specified Comtrade waveform file input, PSCAD/Hypersim data array input, process layer network GOOSE data or null data. The simulation main interface process of the PC supports import of a directory of application programs, automatically forms Makefile, calls a PC compiler, and forms a dynamic link library of the application programs. The simulation main interface process acquires the task operation statistical information recorded by the virtual managing process, provides interface display including the task operation time of each grade and the current task count, and supports tabular information display and graphical information display.

A running system for an embedded type virtual device includes a visual configuration subsystem, a simulation interface subsystem, a virtual managing subsystem, a real-time subsystem, a non-real-time subsystem, a platform interface library subsystem, a virtual data input subsystem and a debugging client subsystem, where the visual configuration subsystem is used for configuring hardware and software functions of the embedded type device, setting application functions of the device by adopting graphical symbols and visual pages, and forming a drive packet and a configuration file of the device;

the simulation interface subsystem is used for setting simulation information, starting or stopping simulation, displaying virtual device output information and task statistics, and automatically compiling application programs; the simulation interface subsystem supports user import of a plurality of directory files, automatically forms Makefile, and compiles application programs; the simulation interface subsystem supports setting of simulation modes and simulation data sources, starts the virtual managing process, acquires and displays the output information of the virtual managing process, acquires the statistical information of the real-time task, and displays the statistical information of the real-time task in modes of a table, a chart and the like;

the virtual managing subsystem reads the configuration file of the device, loads the real-time subsystem and the non-real-time subsystem of the device, schedules real-time tasks and non-real-time tasks, and creates and releases the sharing memory;

the real-time subsystem is corresponding to the program function of each processor of the device and is compiled into a dynamic link library;

the non-real-time subsystem is corresponding to the non-real-time process developed by the main CPU of the device based on the operating system, is used for simulation of various communication server terminals and public service processes of the device, and is compiled into a dynamic link library;

the platform interface library subsystem includes a real-time library of the DSP, a real-time library of the main CPU and a non-real-time library of the main CPU, provides device platform-based public interfaces and services, defines export interface functions of the real-time modules and the non-real-time modules, and provides functions of data registration, variable management, bus communication and the like;

the virtual data input subsystem provides data sources for the virtual device, supports waveform reading and analysis and channel mapping, supports the output data of third-party simulation software such as EMTDC/PSCAD and Hypersim software, and supports a data array in a self-defining format;

the debugging client subsystem includes a visual debugging client for supporting visual page debugging, includes a virtual liquid crystal debugging client for displaying the liquid-crystal hierarchical menu and main screen content of a physical device, includes an IEC61850 debugging client for displaying device models, reports, data sets and constant values, includes an IEC103 debugging client for displaying general packet data and uploading waveforms, and includes a printing client for printing device menus, constant values and waveform data; and the debugging client subsystem is developed based on a public system library interface, and new sub-modules can be flexibly added.

Advantageous Effect

After the above solution is adopted, the present invention has the following advantageous effects: by dividing the device into the managing process, the real-time modules and the non-real-time modules, complete simulation and testing of the complete functions of the device are supported; based on the platform-based development method, the configuration of device research and development personnel and programs can be carried out in an actual device and a virtual device, and homologous maintenance is carried out, thereby obviously increasing the development efficiency, increasing the problem diagnosis and problem troubleshooting efficiency in the development process, and improving the development quality; and the device research and development personnel can also carry out parallel development during the business trip and without the device, thereby shortening the development period.

DETAILED DESCRIPTION OF THE INVENTION

Figure 1:
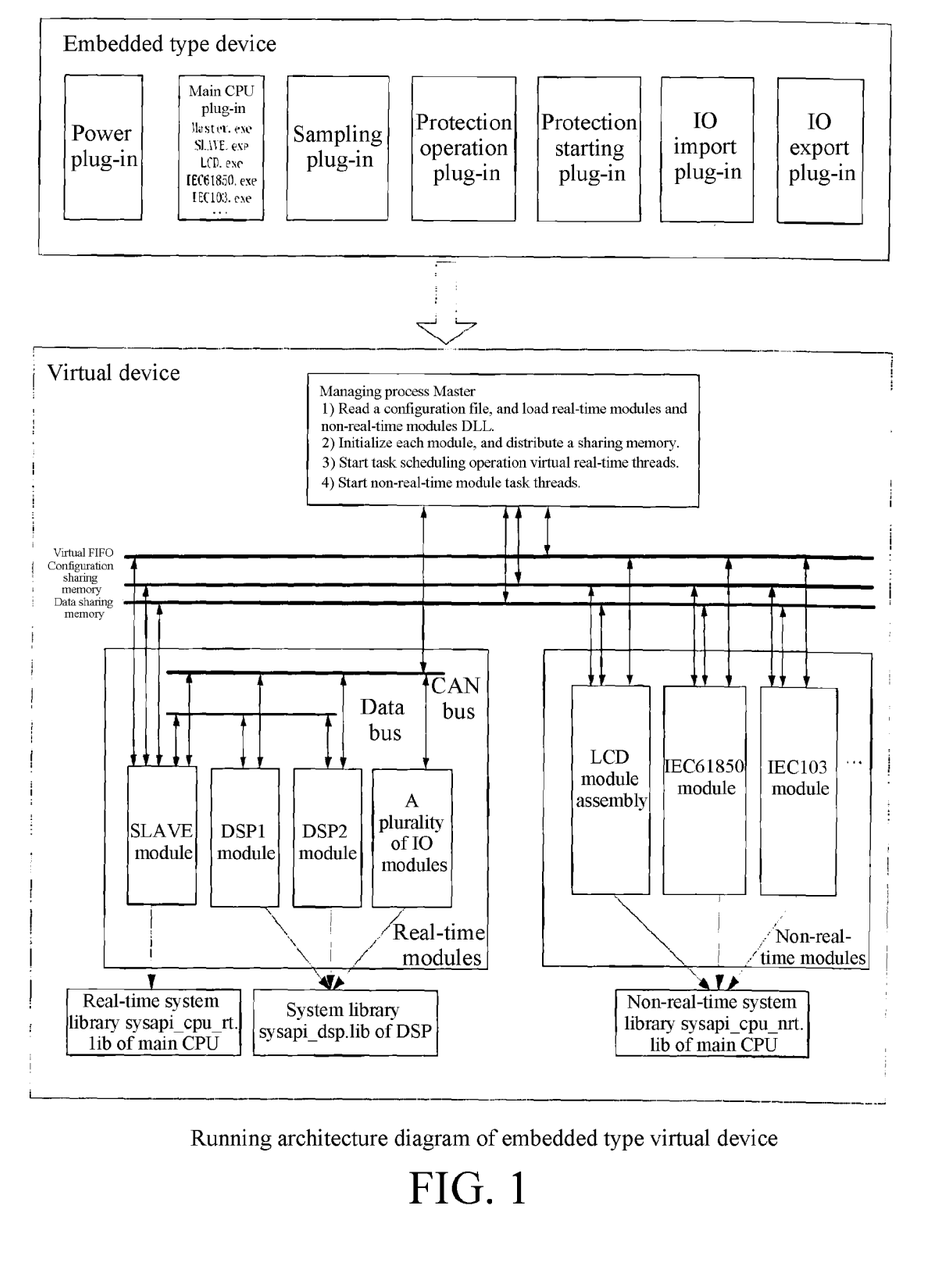
FIG. 1 shows a running architecture of an embedded type virtual device in the present invention.

The technical solution of the present invention is described in detail below with reference to accompanying drawings. An embedded type device is divided into a virtual managing process Master, a plurality of real-time modules and a plurality of non-real-time modules, the virtual managing process reads a configuration file of the device and loads the real-time modules and the non-real-time modules, and the virtual managing process starts a real-time scheduling thread, serially schedules the tasks of each real-time module in grades according to a task period setting relation, and realizes accurate synchronization of data exchange among a plurality of processors. The virtual managing process starts a plurality of threads to run event callback and period tasks of the non-real-time modules, and carries out parallel communication with a plurality of protocol debugging clients. The running implementation method for the embedded type virtual device is as shown in FIG. 1 and includes the following steps:

1) The simulation main interface process of a PC provides a setting interface, acquires simulation setting information (path name of the configuration file of the device, simulation input data, simulation time, and the like), calls the simulation setting information by means of command lines, and starts the virtual managing process Master of the embedded type device. The virtual managing process reads the configuration file of the device and acquires the configuration information of hardware. In a Windows operating system, the virtual managing process loads the real-time module corresponding to each processor by means of LoadLibrary (preferably, the SLAVE real-time module of the main CPU is SLAVE.dll, and other processors are named by ID, such as B02.dll, B03_C1R1.dll). The virtual managing process acquires a plurality of process configuration information (process name, process call formal parameter, and the like) of a main CPU (a processor with an operating system, such as a Linux operating system of the embedded type device), and loads the corresponding non-real-time module of an upper computer (such as LCD.dll and IEC61850.dll). The managing process reads the man-machine communication configuration information (LCD menu reference table, displacement report, recording, and other variable configuration packets) in the configuration file, and creates a configuration sharing memory. When loading modules, the managing process extracts and records a predefined module export function address, and predefined function interfaces are defined in the system library, such as newModule, initModule, freeModule, runTask1 and runTask2 interfaces.

The system library based on the embedded type device is subjected to transplantation and reconstruction under the Windows operating system to form a system library of the DSP, a real-time library of the main CPU and a non-real-time library of the main CPU. The real-time module of the DSP is a dynamic link library of application programs and is compiled by an operating system-less application program of the embedded type device and a virtual system library of the DSP. The real-time module SLAVE of the main CPU is a dynamic link library and is compiled by a real-time program developed by the embedded type device based on an operating system after transplantation and reconstruction and a virtual real-time system library of the main CPU. The non-real-time module is compiled by a non-real-time program developed by the embedded type device based on the operating system after transplantation and reconstruction and a virtual non-real-time system library of the main CPU. The simulation main interface process of the PC supports import of a directory of application programs, automatically forms Makefile, calls a PC compiler (VC or GCC compiler), and forms a dynamic link library of the application programs. Based on a virtual platform library of the PC, only the compiling environment of the application program of the device needs to be switched to realize recompilation, and codes of an application layer do not need to be modified.

Preferably, the configuration file of the embedded type device is formed by means of a visual configuration tool, the virtual simulation device and the actual device share the same configuration file, and the application personnel do not need to modify the device configuration.

After the simulation main interface process of the PC starts the virtual managing process, the prompt information (printf/perror output information and the like is acquired) in initialization and running processes of a Master virtual device is acquired by means of output redirection and is displayed on an interface. The simulation main interface process acquires the task operation statistical data recorded by the virtual managing process (preferably, the simulation main interface process acquires related data by means of interprocess Pipe communication), provides interface display including the task operation time of each grade and the current task count, and supports tabular information display and graphical information display.

The simulation main interface process of the PC also supports setting of virtual simulation data sources and can select simulation modes, such as Comtrade waveform file input, PSCAD/Hypersim/self-defining data array input (preferably, storage is carried out point by point according to channels by adopting a text format), process layer network GOOSE data (preferably, GOOSE messages of a link layer are acquired by means of winpcap package capture), and null data, and the Master switches corresponding simulation modes according to command formal parameters. During waveform and data array input, the Master reads data point by point in a real-time thread, and the real-time module acquires the input data of the current point according to the channel number by means of a callback function.

Figure 2:
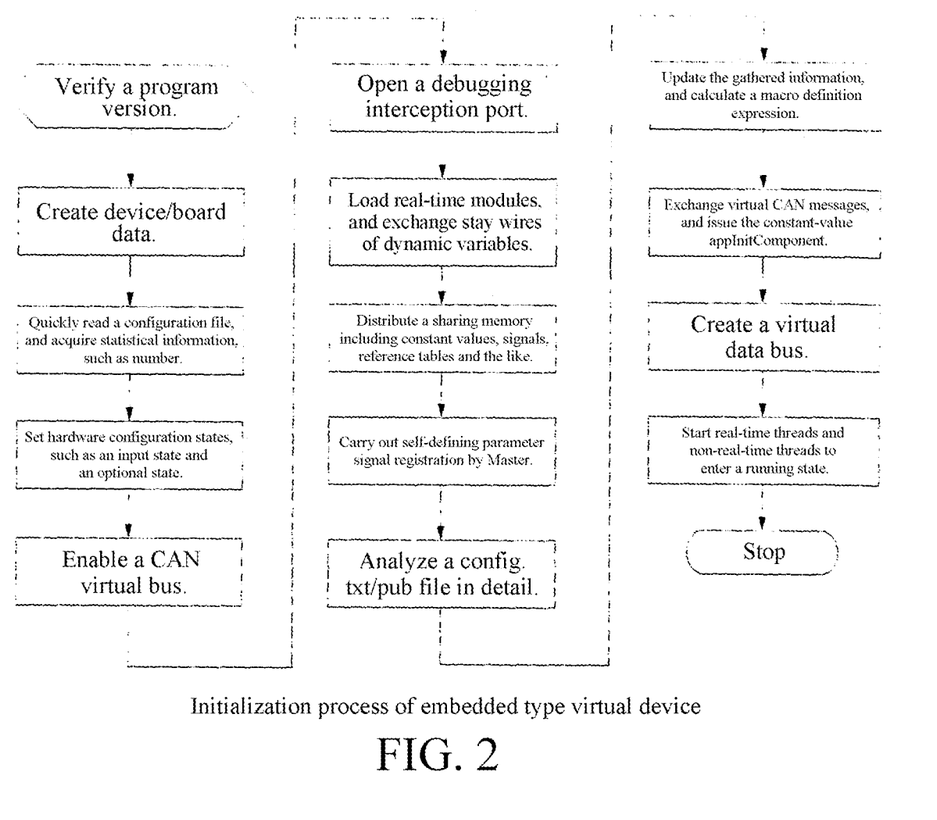
FIG. 2 shows an initialization process of the embedded type virtual device in the present invention.

2) The virtual managing process carries out initialization interaction by means of a virtual CAN bus and the real-time modules according to a hardware statement order, the real-time modules transfer input and output variable registration information and constant value registration information, and the managing process issues the task period information of the device, gathers the data exchange information of each real-time module, distributes variable data exchange addresses for each interrupt in a data bus, and creates the data bus. The virtual managing process carries out initialization interaction by means of virtual FIFO and the non-real-time modules according to a non-real-time process statement order in the configuration file, the non-real-time modules transfer variable registration information and constant value registration information, the managing process issues the related information of the sharing memory, and the non-real-time process can read the configuration sharing memory during initialization so as to complete the initialization work corresponding to this module. The initialization process of the embedded type virtual device is as shown in FIG. 2.

Figure 3:
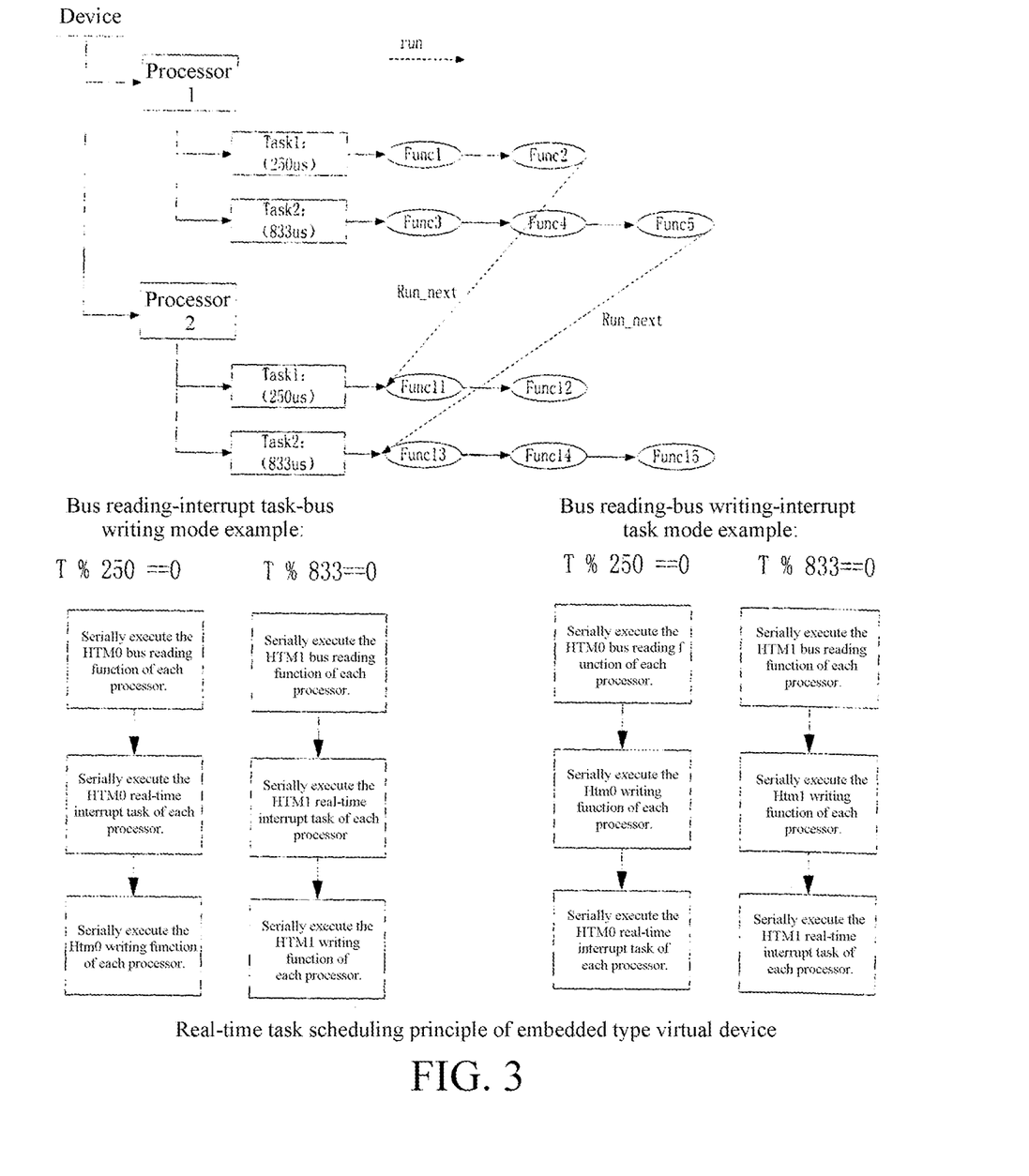
FIG. 3 shows a real-time task scheduling principle of the embedded type virtual device in the present invention.

3) The virtual managing process starts a virtual real-time task scheduling thread, calls an export interface predefined by the real-time modules, and serially schedules the real-time tasks in each period in grades. The task scheduling principle of the real-time thread is as shown in FIG. 3. The tasks of each real-time module are serially managed according to the period grade, the virtual real-time task scheduling thread calculates the least common multiple of a plurality of real-time task periods of the device, the least common multiple is taken as a step size cycle, and when the step sizes are accumulated to the period value of the corresponding grade, the task of this grade is called and the time mark of the virtual device is updated to the sharing memory, where the minimum resolution is virtual 1 microsecond. The virtual real-time task scheduling thread supports scheduling according to an order of data bus reading, real-time task operation and data bus writing so as to accurately simulate one point delay of a parallel bus of the embedded type device, and also supports scheduling according to an order of data bus reading, data bus writing and real-time task operation so as to accurately simulate two point delays of a serial bus of the embedded type device, where scheduling modes can be configured. The period calling interface of the non-real-time thread supports communication message receiving and transmitting tasks based on event trigger (select/poll event of TCP, reading and writing events of serial port, and the like), and supports reading of the actual time of the PC to execute a millisecond-grade period task (the platform library provides an AddTimerTask managing period task, and multi-period task scheduling of the non-real-time modules is carried out by calculating the difference between the current time and the last time at the period calling interface). One non-real-time module is corresponding to one thread, and the managing process starts a plurality of non-real-time threads, calls period tasks of the non-real-time modules, and carries out parallel communication with a plurality of debugging clients.

4) In the running process of the virtual device, the real-time modules acquire interactive data between processors based on the data bus, and the real-time modules exchange data with the non-real-time modules based on the sharing memory. The real-time SLAVE module supports refreshing of the variable agents of the non-real-time modules to the data bus so as to be transferred to other processors. The real-time module SLAVE creates a circular buffer area, can store the second-grade data accumulated by the data bus (such as interrupt interaction data of a serial high speed bus accumulated for 3 seconds), and can derive a plurality of period data before recording trigger when the virtual device forms a waveform file. The non-real-time module reads the data of the corresponding point from the shared data buffer area according to the current virtual time mark in the sharing memory so as to be transferred to a debugging client to be displayed.

Figure 4:
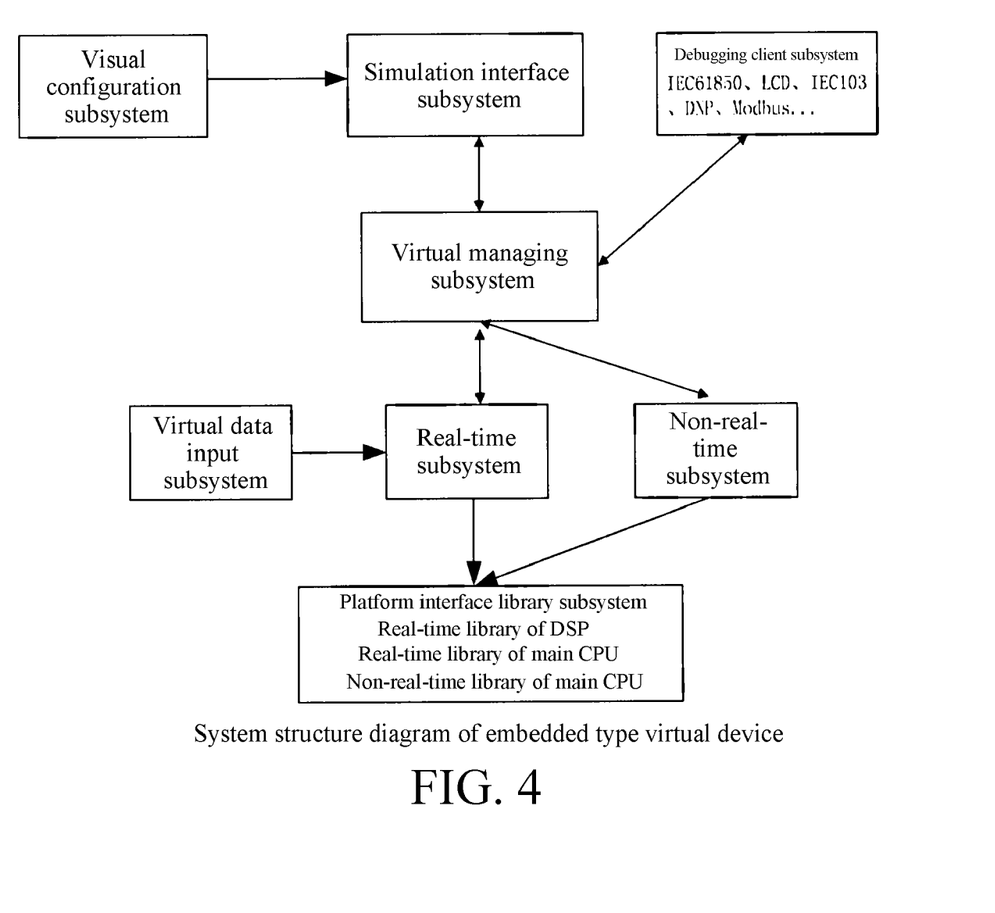
FIG. 4 shows a system structure of the embedded type virtual device in the present invention.

A running system for an embedded type virtual device as shown in FIG. 4 includes a visual configuration subsystem, a simulation interface subsystem, a virtual managing subsystem, a real-time subsystem, a non-real-time subsystem, a platform interface library subsystem, a virtual data input subsystem and a debugging client subsystem, where the visual configuration subsystem is used for configuring hardware and software functions of the embedded type device, supporting setting of application functions of the device by adopting graphical symbols and visual pages, supporting tabular configuration of constant value packets, man-machine interface information of the device, communication point tables and the like, and forming a drive packet and a configuration file of the device, and the formed configuration file is an input file of the virtual device;

the simulation interface subsystem is used for setting simulation information, starting or stopping simulation, displaying virtual device output information and task statistics, automatically compiling application programs and the like, the simulation interface subsystem supports user import of a plurality of h/c files in a directory, the subsystem automatically scans and acquires the h/c files in the directory, automatically forms Makefile required by a VC or GCC compiler, calls the compiler, links the system library, compiles application programs and forms a *.DLL file of a dynamic link library. The subsystem supports setting of simulation modes and simulation data sources (the simulation modes include Comtrade waveform file input, PSCAD/Hypersim self-defining data array input, process layer network GOOSE data, null data and the like), and the subsystem starts the virtual managing subsystem, acquires and displays the output information of the virtual managing process, acquires the statistical information of the real-time task and displays the statistical information of the real-time task in modes of a table, a chart and the like;

the virtual managing subsystem reads the configuration file of the device in a main inlet function, acquires the configuration information of hardware, loads the real-time subsystem of the device, acquires the process configuration information of the main CPU, loads the non-real-time subsystem, creates related threads, schedules real-time tasks and non-real-time tasks, and creates and releases the sharing memory;

the real-time subsystem is corresponding to the program function of each processor of the device and is compiled into a dynamic link library;

the non-real-time subsystem is corresponding to the non-real-time process developed by the main CPU of the device based on the operating system, and has functions, such as printing, for various communication server terminals and public service of the device;

the platform interface library subsystem includes a real-time library sysapi_dsp.lib of the DSP, a real-time library sysapi_cpu_rt.lib of the main CPU and a non-real-time library sysapi_cpu_nrt.lib of the main CPU, and the subsystem provides device platform-based public interfaces and services, defines export interface functions of the real-time modules and the non-real-time modules, and provides functions of data registration, variable management, bus communication and the like;

the virtual data input subsystem provides data sources for the virtual device, supports waveform reading and analysis and channel mapping, supports the output data of third-party simulation software such as EMTDC/PSCAD and Hypersim software, and supports a data array in a self-defining format;

the debugging client subsystem includes a visual debugging client for supporting double-click of connecting lines of visual pages, issuing variables to the virtual managing subsystem which transfers variable values, and displaying data in real time, includes a virtual liquid crystal debugging client for displaying the liquid-crystal hierarchical menu and main screen content of a physical device and issuing a debugging control command, includes an IEC61850 debugging client for reading device models by means of an IEC61850 protocol and displaying reports, data sets and constant values, includes an IEC103 debugging client for displaying general packet data and uploading waveforms by means of IEC103 network and serial port protocols, and includes a printing client for printing device menus, constant values and waveform data based on network protocols; the debugging client subsystem is developed based on a public system library interface, and new sub-modules can be flexibly expanded and added; and the debugging client subsystem supports click on related buttons in the simulation subsystem, starts related debugging clients, carries out TCP communication by means of 127.0.0.1, and supports virtual keyboard response events, serial port receiving and transmitting and the like.

The above embodiments are merely used for explaining the technical idea of the present invention, and the protection scope of the present invention cannot be limited. Any change made based on the technical solution according to the technical idea of the present invention falls within the protection scope of the present invention.

What is claimed is:

1. A running method for an embedded type virtual device, wherein the running method comprises the following specific steps:

step 1: simulation information is set, a virtual managing process of the embedded type virtual device is started, and the virtual managing process reads a configuration file of the embedded type virtual device, acquires a configuration information of hardware, loads a real-time module of each processor, acquires a process configuration information of a main CPU, and loads a corresponding non-real-time module; the virtual managing process reads a man-machine communication configuration information in the configuration file, and creates a configuration sharing memory; when loading the real-time and non-real-time modules, the virtual managing process extracts and records a predefined module export function address, wherein a system library based on the embedded type virtual device is subjected to transplantation and reconstruction under the Windows operating system to form a system library of the DSP, a real-time library of the main CPU and a non-real-time library of the main CPU;

step 2: the virtual managing process carries out initialization interaction by means of a virtual CAN bus and the real-time modules according to a hardware statement order, and the virtual managing process gathers a data exchange information of each real-time module and creates a data bus; the virtual managing process carries out initialization interaction by means of virtual FIFO and the non-real-time modules according to a non-real-time process statement order in the configuration file;

step 3: the virtual managing process starts a virtual real-time task scheduling thread, calls an export interface predefined by the real-time modules, and serially schedules real-time tasks in each period in grades according to a task period setting relation; the virtual managing process starts a plurality of non-real-time threads, calls period tasks of non-real-time modules, and carries out parallel communication with a plurality of debugging clients; and step 4: in a running process of the embedded type virtual device, the real-time modules acquire interactive data between processors based on the data bus, and the real-time modules exchange data with the non-real-time modules based on the configuration sharing memory; a real-time SLAVE module refreshes variable agents of the non-real-time modules to the data bus so as to be transferred to other processors.

2. The running method for the embedded type virtual device according to claim 1, wherein in step 1, the real-time module of a DSP processor is a dynamic link library and is compiled by an operating system-less application program of the embedded type virtual device and a virtual system library of the DSP;

the real-time SLAVE module of the main CPU is a dynamic link library and is compiled by a real-time program developed by the embedded type virtual device based on the operating system after transplantation and reconstruction and a virtual real-time system library of the main CPU;

the non-real-time module is compiled by a non-real-time program developed by the embedded type virtual device based on the operating system after transplantation and reconstruction and a virtual non-real-time system library of the main CPU; and based on a virtual platform library of a PC, a compiling environment of the application program of the embedded type virtual device is switched to realize recompilation, and a virtual simulation device and an actual device share the same configuration file.

3. The running method for the embedded type virtual device according to claim 1, wherein in step 3, the tasks of each real-time module are serially managed according to the period grade, the virtual real-time task scheduling thread calculates a least common multiple of a plurality of real-time task periods of the device, the least common multiple is taken as a step size cycle, and when the step sizes are accumulated to a period value of the corresponding grade, the task of this grade is called and a time mark of the embedded type virtual device is updated to the sharing memory.

4. The running method for the embedded type virtual device according to claim 1, wherein in step 3, the virtual real-time task scheduling thread carries out scheduling according to an order of data bus reading, real-time task operation and data bus writing so as to accurately simulate one point delay of a parallel bus of the embedded type virtual device;

or the virtual real-time task scheduling thread carries out scheduling according to an order of data bus reading, data bus writing and real-time task operation so as to accurately simulate two point delays of a serial bus of the embedded type virtual device.

5. The running method for the embedded type virtual device according to claim 1, wherein in step 3, a period calling interface of a non-real-time thread supports communication message receiving and transmitting tasks based on event trigger, and supports reading of an actual time of a PC to execute a millisecond-grade period task.

6. The running method for the embedded type virtual device according to claim 1, wherein in step 4, the real-time SLAVE module creates a circular buffer area, stores a second-grade data accumulated by the data bus, and is used for recording a plurality of period data before recording trigger during recording of the embedded type virtual device; and the non-real-time module reads the data from the buffer area according to a current virtual time mark in the configuration sharing memory so as to be transferred to a debugging client to be displayed.

7. The running method for the embedded type virtual device according to claim 1, wherein in step 1, after the virtual managing process is started, a prompt information in initialization and running processes of the embedded type virtual device is displayed in real time by means of output redirection.

8. The running method for the embedded type virtual device according to claim 1, wherein in step 1, simulation modes supported by the simulation information comprise specified Comtrade waveform file input, PSCAD/Hypersim data array input, process layer network GOOSE data or null data.

9. The running method for the embedded type virtual device according to claim 1, wherein in step 1, Makefile is formed by importing a directory of application programs, and a dynamic link library of the application programs is formed by calling a PC compiler.

10. The running method for the embedded type virtual device according to claim 1, wherein in step 1, interface display is provided for a task operation statistical information recorded by the virtual managing process, a content of information interface display comprises a task operation time of each grade and a current task count, and a form of information interface display supports tabular information display and graphical information display.

11. An embedded type virtual device, comprising a processor, wherein the processor is used for operating a plurality of modules stored in the processor: a visual configuration module, a simulation interface module, a virtual managing module, a real-time module, a non-real-time module, a platform interface library module, a virtual data input module and a debugging client module, wherein the visual configuration module is used for configuring hardware and software functions of the embedded type virtual device, setting application functions of the embedded type virtual device by adopting graphical symbols and visual pages, and forming a drive packet and a configuration file of the device;

the simulation interface module comprises simulation modes including Comtrade waveform file input, PSCAD/Hypersim self-defining data array input, process layer network GOOSE data, null data and is used for setting simulation information, starting or stopping simulation, displaying embedded type virtual device output information and task statistics, and automatically compiling application programs;

the simulation interface module supports user import of a plurality of directory files, automatically forms Makefile, and compiles said application programs; the simulation interface module supports setting of simulation modes and simulation data sources, starts the virtual managing process, acquires and displays an output information of a virtual managing process, acquires a statistical information of the real-time task, and displays the statistical information of the real-time task in modes of a table, a chart and the like;

the virtual managing module reads a configuration file of the embedded type virtual device, loads the real-time module and the non-real-time module of the embedded type virtual device, schedules real-time tasks and non-real-time tasks, and creates and releases a sharing memory;

the real-time module is corresponding to a program function of each processor of the embedded type virtual device and is compiled into a dynamic link library;

the non-real-time module is corresponding to a non-real-time process developed by a main CPU of the embedded type virtual device based on an operating system, is used for simulation of various communication server terminals and public service processes of the embedded type virtual device, and is compiled into the dynamic link library;

the platform interface library module comprises a real-time library of DSP, a real-time library of the main CPU and a non-real-time library of the main CPU, provides device platform-based public interfaces and services, defines export interface functions of real-time modules and non-real-time modules, and provides functions of data registration, variable management, bus communication and the like;

the virtual data input module provides data sources for the embedded type virtual device, supports waveform reading and analysis and channel mapping, supports an output data of third-party simulation software, and supports a data array in a self-defining format;

the debugging client module comprises a visual debugging client for supporting visual page debugging, comprises a virtual liquid crystal debugging client for displaying a liquid-crystal hierarchical menu and main screen content of a physical device, comprises an IEC61850 debugging client for displaying device models, reports, data sets and constant values, comprises an IEC103 debugging client for displaying general packet data and uploading waveforms, and comprises a printing client for printing device menus, constant values and waveform data;

and the debugging client subsystem is developed based on a public system library interface, and new sub-modules can be flexibly added.

* * * * *